W. A. GREENLAW.
FLEXIBLE PIPE JOINT.
APPLICATION FILED MAR. 19, 1910.
978,876.
Patented Dec. 20, 1910.
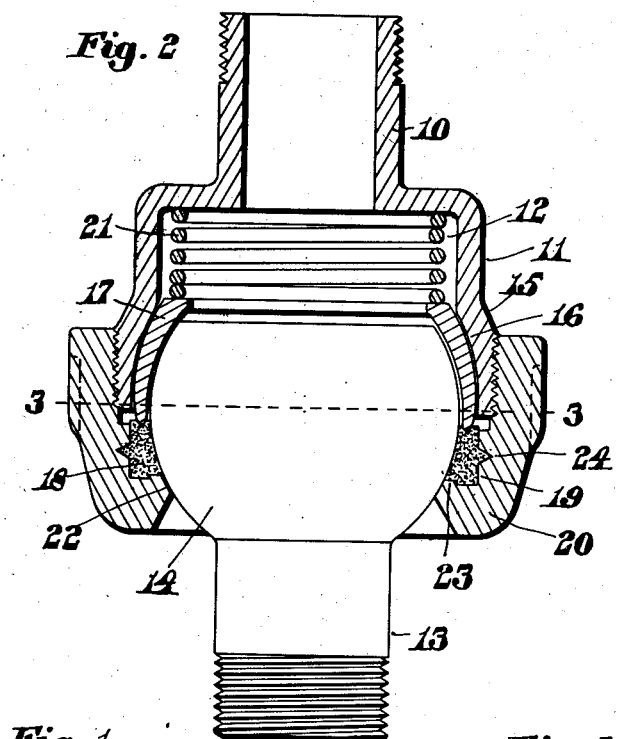
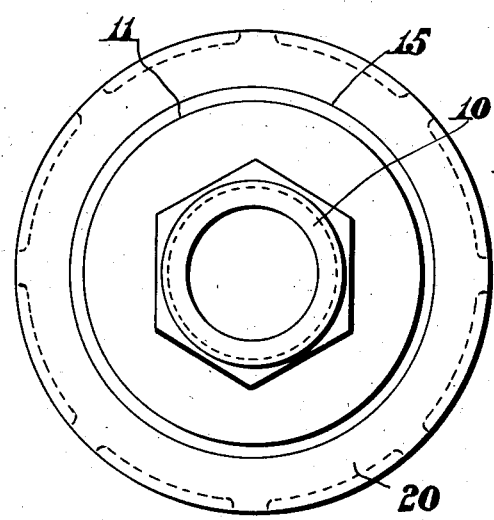
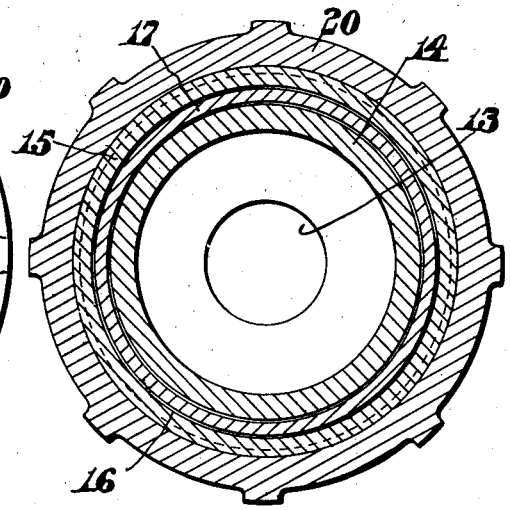
Witnesses:
Nathan C. Lombard
Edna C. Cleveland
Inventor:
Warren A. Greenlaw,
by Walter E. Lombard,
Atty.

UNITED STATES PATENT OFFICE.

WARREN A. GREENLAW, OF MELROSE HIGHLANDS, MASSACHUSETTS, ASSIGNOR TO THE GREENLAW MANUFACTURING COMPANY, OF BOSTON, MASSACHUSETTS, A CORPORATION OF MAINE.

FLEXIBLE PIPE-JOINT.

978,876.  Specification of Letters Patent.  Patented Dec. 20, 1910.

Application filed March 19, 1910. Serial No. 550,535.

*To all whom it may concern:*

Be it known that I, WARREN A. GREEN-LAW, a citizen of the United States of America, and a resident of Melrose Highlands, in the county of Middlesex and State of Massachusetts, have invented certain new and useful Improvements in Flexible Pipe-Joints, of which the following is a specification.
This invention relates to flexible pipe joints and has for its object the production of a suitable means for packing the joint between the two pipe members so that leakage is prevented as the material flows from one pipe member to the other and for providing a suitable stop for the ball when moved into the cup-shaped member.

The invention consists in certain novel features of construction and arrangement of parts which will be readily understood by reference to the description of the drawings and to the claims hereinafter given.

Of the drawings: Figure 1 represents a plan of a pipe joint embodying the features of this invention. Fig. 2 represents a vertical section of the same, and Fig. 3 represents a transverse section of the same, the cutting plane being on line 3—3 on Fig. 2.

Similar characters designate like parts throughout the drawings.

In the drawings, 10 represents a pipe member provided with a cup-shaped end 11 made integral therewith and having an interior chamber 12. The co-acting pipe member 13 is provided with a ball end 14 which is adapted to enter the chamber 12 of said cup-shaped member. The extreme end of the cup-shaped member is made flaring as indicated at 15 and has a spherical inner wall 16 eccentric to the ball end 14.

Interposed between the spherical wall 16 of the flaring end 15 and the periphery of the ball 14 is a ring 17, the inner wall of which is eccentric to the outer wall thereof but normally concentric with the ball end 14. By making the inner wall of this member 17 eccentric to the outer wall thereof one end thereof is made much thinner than its opposite end and this thinner end is slightly tapered and is forced into a ring 18 of packing material fixedly secured in a recess 19 in a cap 20 threaded to the outer face of the flaring end 15. The opposite end of the member 17 extends some distance beyond the inner end of the ball member 14 and has interposed between this end and the inner wall of the chamber 12 a spiral spring 21 which normally retains the member 17 in engagement with the packing ring 18.

The cap 20 is provided with a semi-spherical seat 22 which bears upon the outer periphery of the ball 14 and prevents the outward movement of the pipe member 13.

By making the end of the cup-shaped member 12 flaring as indicated at 15 a larger ball is capable of being used and as a consequence a greater seating surface is provided for said ball upon the packing ring 18, thereby making the packing ring 18 last considerably longer than has been the case in the joints heretofore used.

Normally when the joint is in use there is a slight space between the inner wall of the member 17 and the periphery of the ball 14 and there is a similar space between the outer wall of said member 17 and the spherical wall 16 of the flaring end 15, thereby reducing the frictional contact between the various members to a minimum. It is obvious, therefore, that during this movement of the pipe member 13 about the center of the ball 14 the periphery of said ball will bear upon the seat 22 and any tendency for the air or other material passing through the pipe members 10 and 13 to escape at this point will be effectually prevented by the packing ring 18. Any increase of pressure brought to bear upon the upper face of the member 17 either by the air or other material passing through the pipe members 10 and 13 or by the compression of the spring 21 when the ball end 14 is forced inwardly from any cause will force the thinner end of said member 17 into the packing ring 18 and cause this packing ring to more firmly contact with the periphery of the ball 14 and thereby prevent any leakage under various conditions of pressure within the chamber 12 and various positions of the ball member 14 relative to the cup-shaped member 11. When the ball end 14 is forced inwardly it will come into contact with the semi-spherical inner wall of the member 17 and force the member 17 into contact with the semi-spherical wall 16 of the flaring end 15, thus forming an effectual stop for any further inward movement of the ball while at the same time owing to the fact that the inner wall of the member 17 is concentric with the periphery of the ball 14 said pipe member 13 may be moved about the center of said ball end 14 in either direction and without at any time cutting off any portion of the flow of material through said joint. This makes a very effective pipe joint which is especially adapted for use in connection with train pipes through which air is conveyed to the air brakes of a train, as the member 17, controlled by the spring 21, and the pressure contained within the chamber always acts upon the packing ring 18 under all conditions to make an effectual seal between said packing member and the ball end 14 to prevent any leakage by the seat 22.

The cap 20 is provided with an inwardly extending flange 23 which prevents the packing ring 18 from becoming laterally displaced while the cap is also provided with a depression 24 in the inner wall thereof into which the packing ring 18 is forced, thus forming an abutment which prevents the longitudinal displacement of the ring.

It is quite obvious that it is highly desirable to lock the ring 18 in position in the retaining cap 20 and by means of abutments formed by the inwardly extending flange 23 and the annular grooves 24, this is effectually done.

It is believed that the operation and many advantages of the invention will be fully understood from the foregoing.

Having thus described my invention, I claim:

1. In a flexible pipe joint, the combination of a pipe member provided with a cup-shaped end; a second pipe member having a ball-shaped end positioned within said cup-shaped end; a cap threaded to said cup-shaped end; an annular packing ring therein; and a spring-pressed ring having a semi-spherical surface concentric with said ball-shaped end and a thin edge embedded in said annular packing ring.

2. In a flexible pipe joint, the combination of a pipe member provided with a cup-shaped portion terminating in a flaring end and having a semi-spherical inner wall; a second pipe member having a ball-shaped end positioned within said flaring end; a seat for said ball secured to said cup-shaped end; a packing interposed between said ball and the walls of said cup-shaped end; a ring interposed between said ball and flaring end, said ring extending beyond the inner end of said ball and having a thin edge bearing upon said packing, the outer face of said ring being semi-spherical and eccentric to its inner face; and a spring for forcing the thin edge of said ring into said packing.

3. In a flexible pipe joint, the combination of a pipe member provided with a cup-shaped end; a second pipe member having a ball-shaped end positioned within said cup-shaped end; a seat for said ball secured to said cup-shaped end; a packing interposed between said ball and the walls of said cup-shaped end; a ring with a thin edge bearing upon said packing, the outer and inner faces of which are semi-spherical and eccentric to each other; and a spring for forcing the thin edge of said ring into said packing.

4. In a flexible pipe joint, the combination of a pipe member provided with a cup-shaped cylindrical portion terminating in an enlarged flaring end having a semi-spherical inner wall; a second pipe member having a ball-shaped end positioned within said cup-shaped end and having its periphery eccentric to said semi-cylindrical wall; a seat for said ball secured to said cup-shaped end; a packing interposed between said ball and the walls of said cup-shaped end; a ring with a thin edge bearing upon said packing and having its outer wall concentric to said semi-spherical wall and its inner wall concentric with the periphery of said ball; and yielding means for forcing said ring outwardly to permit the thin edge thereon to force said packing against the outer face of said ball.

5. In a flexible pipe joint, the combination of a pipe member provided with a cup-shaped end; a second pipe member having a ball-shaped end positioned within said cup-shaped end; a cap threaded to said cup-shaped end provided with a groove in its inner wall and an inwardly extending flange; an annular packing ring therein retained in position by means of said groove and flange; and a spring-pressed ring having a semi-spherical surface concentric with said ball-shaped end and a thin edge embedded in said annular packing ring.

6. In a flexible pipe joint, the combination of a pipe member provided with a flaring end and having a semi-spherical inner wall; a second pipe member having a ball-shaped end positioned within said flaring end, the spherical faces of the adjacent ends being eccentric to each other; a removable cap secured on the flaring end and provided with a seat for said ball-shaped end; a packing in said cap between the wall thereof and the ball; a ring interposed between the spherical surfaces of the flaring end and the ball-shaped end of the two pipe members, the inner and outer sides of said ring being eccentric to each other and concentric respectively to the ball and the flaring end and normally out of contact with the said ring and having its thin outer edge bearing upon said packing; and yielding means between said ring and the bottom of the flaring end of the pipe member.

7. In a flexible pipe joint, the combination of a pipe member provided with a flaring end and having a semi-spherical inner wall; a second pipe member having a ball-shaped end positioned within said flaring end, the spherical faces of the adjacent ends being eccentric to each other; a removable cap secured on the flaring end and provided with a seat for said ball-shaped end; a packing in said cap between the wall thereof and the ball; a ring interposed between the spherical surfaces of the flaring end and the ball-shaped end of the two pipe members, the inner and outer sides of said ring being eccentric to each other and concentric respectively to the ball and the flaring end and normally out of contact with the said ring and having its outer edge bearing upon said packing; and yielding means between said ring and the bottom of the flaring end of the pipe member.

Signed by me at 4 Post Office Sq., Boston, Mass., this 18th day of March, 1910.

WARREN A. GREENLAW.

Witnesses:
EDNA C. CLEVELAND,
NATHAN C. LOMBARD.